(12) United States Patent
Hashimoto et al.

(10) Patent No.: US 7,259,189 B2
(45) Date of Patent: Aug. 21, 2007

(54) EXPANDED POLYPROPYLENE RESIN BEADS AND PROCESS FOR THE PRODUCTION THEREOF

(75) Inventors: Keiichi Hashimoto, Utsunomiya (JP); Akinobu Hira, Kanuma (JP); Hidehiro Sasaki, Tochigi-ken (JP)

(73) Assignee: JSP Corporation, Tokyo (JP)

( * ) Notice: Subject to any disclaimer, the term of this patent is extended or adjusted under 35 U.S.C. 154(b) by 491 days.

(21) Appl. No.: 10/855,633

(22) Filed: May 28, 2004

(65) Prior Publication Data
US 2004/0254254 A1 Dec. 16, 2004

(30) Foreign Application Priority Data
Jun. 12, 2003 (JP) .............................. 2003-168341

(51) Int. Cl.
*C08J 9/16* (2006.01)
*C08J 9/22* (2006.01)

(52) U.S. Cl. ............................ 521/57; 264/51; 521/56; 521/134; 525/191; 525/240

(58) Field of Classification Search ................. 521/56, 521/57, 134; 264/51; 525/191, 240
See application file for complete search history.

(56) References Cited

U.S. PATENT DOCUMENTS

| | | | | |
|---|---|---|---|---|
| 4,504,534 A | | 3/1985 | Adachi et al. ................. 428/71 |
| 4,756,948 A | | 7/1988 | Kuramochi et al. ......... 428/167 |
| RE32,780 E | | 11/1988 | Yoshimura et al. ....... 428/304.4 |
| 5,073,444 A | * | 12/1991 | Shanelec ................. 428/313.5 |
| 5,340,841 A | | 8/1994 | Tokoro et al. ................. 521/60 |
| 5,747,549 A | | 5/1998 | Tsurugai et al. ............... 521/60 |
| 6,034,144 A | | 3/2000 | Shioya et al. .................. 521/60 |
| 6,451,419 B1 | | 9/2002 | Tsurugai et al. .......... 428/304.4 |
| 6,890,009 B2 | * | 5/2005 | Murata et al. .............. 293/109 |
| 6,956,067 B2 | * | 10/2005 | Sasaki et al. .................. 521/56 |
| 2003/0011091 A1 | | 1/2003 | Tokoro et al. ............. 264/46.4 |
| 2003/0034580 A1 | | 2/2003 | Sasaki et al. .................. 264/51 |

FOREIGN PATENT DOCUMENTS

| | | |
|---|---|---|
| CA | 2421888 | 3/2003 |
| EP | 1 275 687 A | 1/2003 |
| JP | 07-300537 | 11/1995 |
| JP | H07/300537 | 11/1995 |
| WO | 03/037971 | 5/2003 |
| WO | 03/078127 | 9/2003 |

* cited by examiner

*Primary Examiner*—Allan R. Kuhns
(74) *Attorney, Agent, or Firm*—Bacon & Thomas, PLLC

(57) ABSTRACT

A process for the production of expanded beads, including kneading a base resin containing a polypropylene resin and having a tensile modulus of at least 1,200 MPa together with a mixture of a coloring agent and a thermoplastic polymer having a tensile modulus lower than that of the base resin to form a kneaded mixture including a matrix of the base resin and a multiplicity of domains dispersed in the matrix and each containing the thermoplastic polymer and the coloring agent. The kneaded mixture is formed into resin particles, then treated with an organic peroxide to modify surfaces of the resin particles therewith. Foaming and expanding of the surface-modified resin particles gives expanded beads having an inside region surrounded by a surface region. The heat of fusion of a high temperature peak of the surface region is lower than that of the inside region.

20 Claims, No Drawings

EXPANDED POLYPROPYLENE RESIN BEADS AND PROCESS FOR THE PRODUCTION THEREOF

CROSS-REFERENCE TO RELATED APPLICATIONS

This application claims the priority under 35 U.S.C. Section 119 of Japanese Patent Application No. 2003-168341, filed on Jun. 12, 2003, the entire disclosure of which is hereby incorporated by reference herein.

BACKGROUND OF THE INVENTION

1. Field of the Invention

This invention relates to expanded beads of a base resin containing polypropylene resin and a process for the production thereof. The present invention also pertains to a foamed molding obtained from such expanded polypropylene-based resin beads.

2. Description of Prior Art

A polypropylene resin is now increasingly utilized in various fields because of excellent mechanical strength, heat resistance and recyclability thereof. Foamed moldings of a base resin including a polypropylene resin (such a propylene resin-containing base resin will be hereinafter sometimes referred to simply as "polypropylene-based resin"), which retain the above excellent properties of the polypropylene resin and which have excellent additional characteristics such as cushioning property and heat resistance, are thus utilized for various applications such as packaging materials, construction materials, etc. In particular, foamed moldings obtained by heating expanded beads of a base resin including a polypropylene resin in a mold with steam (such foamed moldings will be hereinafter sometimes referred to simply as "PP moldings") are utilized as various parts such as bumper cores and door parts of automobiles.

Recently, there is an increasing demand for PP moldings having higher rigidity and lighter weight than the conventional ones in view of severe standard for collision safety and saving of energy consumption. Generally, however, the melting point of a polypropylene resin increases with an increase of the rigidity. In order to obtain PP moldings having high rigidity, therefore, it is necessary to use a high steam pressure in a large amount and to use a special molding device having a high pressure resistance.

To cope with this problem, International Publication WO 02/24794 proposes a process for the preparation of expanded polypropylene-based resin beads, in which particles of a base resin including a polypropylene resin are dispersed in a dispersing medium containing an organic peroxide. The dispersion is heated to decompose the organic peroxide, thereby obtaining organic peroxide-treated resin particles. The treated resin particles are foamed and expanded using a blowing agent to obtain the expanded polypropylene-based resin beads which permit the production of PP moldings using relatively low temperature steam.

There is also an increasing demand for PP moldings colored with a coloring agent. Japanese Kokai Publication No. H07-300537 discloses a method in which a polypropylene-based resin is previously kneaded with a coloring agent to obtain a master batch. A portion of the master batch and the polypropylene-based resin are then kneaded and formed into particles. The particles are then foamed and expanded using a blowing agent to obtain expanded polypropylene-based resin beads useful for producing colored PP moldings.

SUMMARY OF THE INVENTION

It is an object of the present invention to provide a process for producing expanded polypropylene-based resin beads which can give colored PP moldings using relatively low temperature steam.

Another object of the present invention is to provide expanded beads which can give colored PP moldings using relatively low temperature steam.

The present inventors have attempted to combine the technique disclosed in Japanese Kokai Publication No. H07-300537 with the process of International Publication WO 02/24794 in expectation of obtaining colored PP moldings using relatively low temperature steam. It has been found, however, that when the particles obtained by the method of Japanese Kokai Publication No. H07-300537 using the master batch are dispersed in a dispersing medium containing an organic peroxide and heated to obtain organic peroxide-treated resin particles and when the treated resin particles are foamed and expanded using a blowing agent to obtain expanded polypropylene-based resin beads according to the process of International Publication WO 02/24794, PP moldings cannot be produced from the expanded beads by using relatively low temperature steam.

It has now been found that the coloring agent hinders the surface modification of the polypropylene-based resin particles by an organic peroxide.

Although not wishing to be bound by the theory, the mechanism of the hindrance of a coloring agent, such as a carbon black or a metal-containing colorant, to surface modification of the polypropylene-based resin particles with an organic peroxide is considered as follows. It is inferred that the surface modification of the resin particles by an organic peroxide is ascribed to the formation of smetic crystal phase of the base resin by the action of the decomposed organic peroxide and that, when the coloring agent is present on surfaces of the resin particles, organic peroxide decomposes at a lower temperature by a catalytic action of the coloring agent without being used for modification of the surfaces of the resin particles.

It has also been found that when the coloring agent is prevented from exposing on surfaces of the resin particles, the surface treatment with organic peroxide can be effectively attained.

In accordance with one aspect of the present invention there is provided a process for the production of expanded beads, comprising the steps of:

(a) kneading a base resin including a polypropylene resin and having a tensile modulus of at least 1,200 MPa together with a mixture of a coloring agent and a thermoplastic polymer having a tensile modulus lower than that of said base resin to form a kneaded mixture comprising a matrix of said base resin and a multiplicity of domains dispersed in said matrix and each containing said thermoplastic polymer and said coloring agent;

(b) forming said kneaded mixture into resin particles;

(c) treating said resin particles with an organic peroxide to modify surfaces of said resin particles therewith; and (d) foaming and expanding said surface-modified resin particles to obtain expanded beads.

Since, in the present invention, the coloring agent is contained or embedded in the domains (like islands) of the thermoplastic polymer which are dispersed in the matrix (like a sea) of the base resin, the amount of the coloring agent exposed on surfaces of the resin particles is very small. Therefore, the resin particles can be effectively surface-treated with an organic peroxide. As a result, expanded beads obtained from the surface-treated resin particles permit a PP molding to be produced using low temperature steam.

In another aspect, the present invention provides an expanded bead comprising cell walls defining a plurality of closed cells, each of said cell walls comprising a matrix of a base resin including a polypropylene resin and having a tensile modulus of at least 1,200 MPa and a multiplicity of domains dispersed in said matrix and each containing a coloring agent and a thermoplastic polymer having a tensile modulus lower than that of said base resin, said expanded bead comprising an inside region surrounded by a surface region, each of said inside and surface region showing a high temperature peak in a DSC curve thereof, the heat of fusion of the high temperature peak of the surface region being lower than that of the inside region.

The present invention also provides a foamed molding (PP molding) obtained by heating the above expanded beads in a mold with steam. Such a PP molding is suitably used as packaging materials, construction materials, heat insulation materials, helmet cores, and various automobile parts such as bumper cores, door pats, pillars, tool boxes and floor mats.

Other objects, features and advantages of the present invention will become apparent from the detailed description of the preferred embodiments of the invention to follow.

DETAILED DESCRIPTION OF THE PREFERRED EMBODIMENTS OF THE INVENTION

An expanded bead according to the present invention comprises a plurality of closed cells defined by cell walls constituting the bead. Each of the cell walls comprises a matrix (or sea) of a base resin and a multiplicity of domains (or islands) which are dispersed in the matrix and each of which contains a thermoplastic polymer and a coloring agent. The base resin comprises a polypropylene resin and has a tensile modulus of at least 1,200 MPa, while the thermoplastic polymer has a tensile modulus lower than that of the base resin. The expanded bead has an inside region surrounded by a surface region. Each of the inside and surface regions showing a high temperature peak in a DSC curve thereof, the heat of fusion of the high temperature peak of the surface region being lower than that of the inside region.

The term "polypropylene resin" as used herein refers to a polypropylene homopolymer, a copolymer of propylene and one or more comonomers having a propylene content of at least 70 mole %, preferably at least 80 mole %, a mixture of two or more of the copolymers, or a mixture of the homopolymer and the copolymer. Examples of the copolymer include propylene-ethylene block copolymers, propylene-ethylene random copolymers, propylene-butene random copolymers or propylene-ethylene-butene random copolymers.

It is important that the base resin should have a tensile modulus of at least 1,200 MPa, in order to obtain the desired rigidity as required in the field of vehicles, particularly automobiles. The upper limit of the tensile modulus is not specifically limited but is generally about 3,000 MPa. The tensile modulus is preferably at least 1,250 MPa, more preferably at least 1,300 MPa, most preferably 1360 to 2500 MPa.

It is preferred that the polypropylene resin constituting the base resin have a tensile modulus of at least 1,200 MPa for reasons of obtaining the desired rigidity. The upper limit of the tensile modulus of the polypropylene resin is not specifically limited but is generally about 3,000 MPa. The tensile modulus of the polypropylene resin is preferably at least 1,250 MPa, more preferably at least 1,300 MPa, most preferably 1360 to 2500 MPa. Most propylene homopolymers have such a high tensile modulus. Propylene copolymers having a low content of a comonomer may also have such a high tensile modulus. The term "tensile modulus" as used herein is as measured in accordance with the Japanese Industrial Standard JIS K 7161(1994) using a specimen of a 1A shape (molded directly by injection molding) specified in JIS K 7162(1994) at a testing rate (drawing rate) of 1 mm/minute.

It is preferred that the polypropylene resin have a tensile yield strength of at least 31 Mpa, more preferably at least 32 MPa, for reasons of high compression strength of PP moldings. The upper limit of the yield strength is not specifically limited but is generally about 45 MPa. It is also preferred that the polypropylene resin have a tensile breaking elongation of at least 20%, more preferably at least 100%, most preferably 200 to 1000%, for reasons of freedom of breakage of cells during preparation of expanded beads and during molding of expanded beads for the production of PP moldings. The terms "tensile yield strength" and "tensile breaking elongation" as used herein are as measured in accordance with the Japanese Industrial Standard JIS K 6758(1981).

The polypropylene resin preferably has a melting point of at least 145° C., more preferably at least 155° C., still more preferably at least 158° C., most preferably at least 160° C., for reasons of suitable heat resistance of the PP moldings. The upper limit of the heat resistance is generally about 170° C. For reasons of capability of lowering molding temperature while ensuring satisfactory mechanical properties of the PP moldings, the polypropylene resin preferably has a melt flow rate (MFR) of 3 to 100 g/10 min, more preferably 10–70 g/10 min. The MFR herein is as measured in accordance with the Japanese Industrial Standard JIS K7210 (1976), Test Condition 14.

If desired, the base resin may contain one or more additional resins. The amount of the additional resin in the base resin is preferably no more than 35 parts by weight, more preferably no more than 20 parts by weight, still more preferably no more than 10 parts by weight, most preferably no more than 5 parts by weight, per 100 parts by weight of the polypropylene resin. Examples of the additional resins include polyethylene resins such as high density polyethylenes, ethylene-vinyl acetate copolymers, ethylene-acrylic acid copolymers, ethylene-methacrylic copolymers; and polystyrene resins such as polystyrene and styrene-maleic anhydride copolymers.

The base resin may also be blended with one or more additives such as an antioxidant, a UV absorbing agent, an antistatic agent, a fire retardant, a metal-deactivator, a pigment, a nucleus agent and a foam controlling agent. The foam controlling agent may be, for example, an inorganic powder such as zinc borate, talc, calcium carbonate, borax or aluminum hydroxide. The additive or additives are preferably used in an amount of 20 parts by weight or less, more preferably 0.01 to 5 parts by weight, per 100 parts by weight of the base resin. The additive or additives are suitably incorporated into the base resin by kneading.

The additional resin and the additive when contained in the base resin may reduce the tensile modulus of the base resin, depending upon the kinds and amounts thereof. It is important that the additional resin and/or the additive should be used so that the tensile modulus of the base resin be at least 1,200 MPa, more preferably 1,250 MPa, most preferably at least 1,300 MPa.

The above-described base resin forms a sea of the cell walls of the expanded beads. Dispersed in the sea are a plurality of islands containing a thermoplastic polymer and a coloring agent. Since the coloring agent is embedded in the islands of the thermoplastic polymer dispersed in the sea of the base resin, the amount of the coloring agent exposed on surfaces of the expanded beads is very small. Therefore, the expanded beads have a surface region effectively surface-treated with an organic peroxide and, therefore, having such a high temperature peak in a DSC curve thereof that the heat of fusion is lower than that of a inside region surrounded by the surface region. As a result, expanded beads permit a PP molding to be produced using low temperature steam.

Any thermoplastic polymer may be used for the forming the domains as long as it has a tensile modulus lower than that of the base resin. Illustrative of suitable thermoplastic polymers are an ethylene-based polymer, a thermoplastic elastomer and a propylene-based polymer.

The ethylene-based polymer may be, for example, a linear ethylene homopolymer, a branched ethylene homopolymer or an ethylene copolymer having a content of ethylene monomer units of at least 50 mole %. Examples of the ethylene copolymer include copolymers of ethylene and an α-olefin other than ethylene, copolymers of ethylene and vinyl acetate, copolymers of ethylene and acrylic acid and copolymers of ethylene and methacrylic acid.

It is preferred that the ethylene-based polymer have a density of less than 930 g/L for reasons of excellent surface smoothness of expanded beads obtained using same. The lower limit of the density of the ethylene-based polymer is generally 850 g/L. Examples of the ethylene-based polymer having a density of less than 930 g/L include linear ethylene homopolymers such as linear low density polyethylene, branched ethylene homopolymers such as branched low density polyethylene and ethylene-propylene rubbers such as binary copolymer rubbers and ternary copolymer rubbers of ethylene. The linear and branched low density polyethylene generally have a density of 910 g/L or more. The binary copolymer rubber may be an ethylene-propylene rubber, while the ternary copolymer rubber may be an ethylene-propylene-diene rubber. Above all, the use of the ethylene-propylene rubber is particularly preferred for reasons of low costs and easiness in forming discrete coloring agent-containing islands dispersed in the sea of the base resin.

It is particularly preferred that the above ethylene-propylene rubber have an ethylene content of 70 to 95 mole % for reasons of good dispersibility thereof in the matrix of the base resin to form uniformly dispersed islands of the ethylene-propylene rubber containing the coloring agent. Therefore, the expanded beads can be foamed and molded in a mold with a high secondary expansion efficiency using low temperature steam to give a uniformly colored PP molding.

It is also preferred that the ethylene-based polymer have a melt flow rate (MFR) of 2 to 30 g/10 min for reasons of dispersibility thereof. From the standpoint of easiness in forming and productivity of resin particles (non-expanded precursor of expanded beads), the MFR of the ethylene-based polymer is more preferably at least 3 g/10 min, most preferably at least 4 g/10 min. From the standpoint of rigidity and compression strength of a PP molding obtained from the expanded beads, the MFR of the ethylene-based polymer is more preferably 25 g/10 min or less, most preferably 20 g/10 min or less.

The thermoplastic elastomer suitably used as the thermoplastic polymer may be, for example, a styrene-based polymer elastomer such as a butadiene copolymer elastomer or a hydrogenated derivative thereof, a styrene-isoprene copolymer elastomer or a hydrogenated product thereof, a styrene-butadiene-butylene-styrene block copolymer elastomer (SBBS) or a styrene-ethylene-butylene-styrene block copolymer elastomer (SEBS); an olefin-based polymer elastomer such as an ethylene-octene polymer elastomer, an ethylene-butylene polymer elastomer; or a chlorinated olefin elastomer such as chlorinated polyethylene elastomer or a chlorinated polypropylene elastomer.

The thermoplastic elastomer preferably has MFR of 1 to 15 g/10 min for reasons of dispersibility thereof. From the standpoint of easiness in forming and productivity of resin particles (non-expanded precursor of expanded beads), the MFR of the thermoplastic elastomer is more preferably at least 1.5 g/10 min, most preferably at least 2 g/10 min. From the standpoint of rigidity and compression strength of a PP molding obtained from the expanded beads, the MFR of the thermoplastic elastomer is more preferably 10 g/10 min or less, most preferably 8 g/10 min or less.

The propylene-based polymer suitably used as the thermoplastic polymer may be, for example, a copolymer of propylene and one or more comonomers having a propylene content of at least 70 mole %. The comonomer is preferably an α-olefin other than propylene. Examples of the propylene-based polymer include propylene-ethylene block copolymers, propylene-ethylene random copolymers, propylene-butene random copolymers or propylene-ethylene-butene random copolymers.

It is preferred that the propylene-based polymer have MFR of 1 to 20 g/10 min for reasons of dispersibility thereof. From the standpoint of easiness in forming and productivity of resin particles (non-expanded precursor of expanded beads), the MFR of the propylene-based polymer is more preferably at least 1.5 g/10 min, most preferably at least 2 g/10 min. From the standpoint of rigidity and compression strength of a PP molding obtained from the expanded beads, the MFR of the ethylene-based polymer is more preferably 15 g/10 min or less, most preferably 10 g/10 min or less.

When the propylene-based polymer is used as the thermoplastic polymer, the base resin preferably includes a propylene homopolymer for reasons of good dispersibility of the propylene-based polymer in the matrix of the base resin.

The coloring agent contained in the islands together with the thermoplastic polymer may be any conventionally used organic or inorganic pigment. Examples of the inorganic pigment include chromate pigments such as yellow lead, zinc yellow and barium yellow; ferrocyanide pigments such as iron blue; sulfide pigments such as cadmium yellow and cadmium red; oxide pigments such as titanium oxide, iron black and red iron oxide; silicate pigments such as ultramarine blue; and carbon black. Examples of the organic pigment include azo pigments such as monoazo, disazo, azo lake, condensed azo and chelate azo pigments; and polycyclic pigments such as phthalocyanine, anthraquinone, perylene, perinone, thioindigo, quinacridone, dioxazine, isoindolinone, and quinophthalone pigments.

Pigments having a functional group such as a hydroxyl group, a carboxyl group, a carbonyl group, an aldehyde group, an ether group, a quinone group, a carboxylic anhydride or a lactone group are preferably used, since the thermoplastic polymer has a greater tendency to coat surfaces of such pigments.

Carbon black can be easily coated with the thermoplastic polymer and is particularly preferably used for the purpose of the present invention. PP moldings can be colored with a small amount of carbon black and can be recycled without difficulty in adjustment of the black tone of the recycled products. Examples of carbon black include gas furnace black, oil furnace black, acetylene black, channel black, roller black, thermal black and Ketjen black. Carbon black preferably has functional groups on its surface.

Carbon black having an average particle diameter of 5 to 100 nm is preferably used for reasons of uniform coloration of the expanded beads and freedom of breaking the cell walls during a molding step for the production of a PP moldings in a mold (secondary foaming and expanding step). From the standpoint of dispersibility and prevention of agglomeration, the average particle diameter of carbon black is more preferably at least 10 nm, most preferably at least 15 nm. From the standpoint of coloring efficiency, the average diameter is more preferably 80 nm or less, most preferably 60 nm or less.

The average particle diameter herein is measured by electron microscope. Namely, a photograph is taken by an electron photomicroscope such that several hundreds particles are present therein. 1000 Particles are arbitralily selected in total and measured for the diameters with the unidirectional diameter (Green diameter) as the typical diameter. The measured diameters are plotted against the cumulative number % of the particles. The average diameter is a 50% number particle diameter Dn50 (the particles having a diameter of Dn50 or less account for 50% by number of a total number of the particles).

The coloring agent is preferably used in an amount of at least 0.1% by weight, more preferably at least 0.2% by weight, most preferably at least 0.3% by weight, based on the weight of the resin particles for reasons of desired coloration. From the standpoint of prevention of breakage of the cell walls during a molding step, the amount of the coloring agent is preferably less than 5% by weight, more preferably 4.5% by weight or less, most preferably 4.0% by weight or less.

The expanded beads according to the present invention may be prepared as follows.

The above-described thermoplastic polymer is melted and kneaded with the above-described coloring agent using any suitable known kneader to obtain a mixture (master batch) in which the coloring agent particles are each surrounded by and coated with the thermoplastic polymer.

The blending ratio of the thermoplastic polymer to the coloring agent is preferably 40:60 to 90:10 for reasons of effective coating of the coloring agent with the thermoplastic polymer while preventing an increase of the amount of the thermoplastic polymer which will adversely affect the compression strength and other mechanical properties of PP moldings.

A quantity of the master batch is then kneaded with the base resin (and other additives if desired) using any suitable known kneader such as an extruder to form a kneaded mixture including the base resin which forms a sea and a multiplicity of islands dispersed in the sea and containing the thermoplastic polymer and the coloring agent. The amount of the master batch is preferably 30 parts by weight or less, more preferably 20 parts by weight or less, most preferably 10 parts by weight or less, for reasons of easiness of kneading operation and prevention of a reduction in tensile modulus of the kneaded mixture and, hence, in rigidity and other mechanical strengths of PP moldings.

In particular, it is preferred that the amounts and kinds of the master batch, base resin and additives be selected so that the kneaded mixture has a tensile modulus (as measured by the method similar to the above-described measurement method for the tensile modulus of the base resin) of at least 1200 MPa, more preferably at least 1250 MPa, most preferably at least 1300 MPa.

To expedite the formation of the sea-islands structure, it is preferred that the viscosity of the master batch be greater than that of the base resin. The viscosity may be controlled by MFR of the master batch. Thus, the master batch preferably has MFR of 0.1 to 50 g/10 min for reasons of easy formation of the sea-islands structure. From the standpoint of easiness in forming and good productivity of resin particles (non-expanded precursor of expanded beads), the MFR of the master batch is more preferably at least 0.2 g/10 min, most preferably at least 0.3 g/10 min. From the standpoint of easiness in forming the sea-islands structure, the MFR of the master batch is more preferably 30 g/10 min or less, most preferably 10 g/10 min or less. The MFR of the master batch herein is as measured according to JIS K7210 (1976) at a temperature of 230° C. using a load of 68.64 N. When the viscosity of the master batch is lower than that of the base resin, the amount of the master batch is desirably adjusted to 30 parts by weight or less per 100 parts by weight of the base resin.

The formation of the sea-islands structure may be confirmed by transmission electron photomicroscopy.

The kneaded mixture is then formed into particles by any suitable known method. Preferably, the kneaded mixture is extruded through a die into strands and cut to obtain the resin particles. In this case, it is preferred that the strands be quenched immediately after being extruded for reasons that the succeeding surface modification with an organic peroxide, which will be described hereinafter, may be efficiently performed. The quenching may be carried out by introducing the strands in water at 50° C. or less, preferably 40° C. or less, more preferably 30° C. or less. The cooled strands are taken out of the water and cut into particles each having a length/diameter ratio of 0.5–2.0, preferably 0.8–1.3, and a mean weight of 0.1–20 mg, preferably 0.2–10 mg. The mean weight is an average of 200 arbitrarily selected particles.

The above sea-islands structure of the kneaded mixture remains substantially unchanged in the resin particles. For reasons of uniformity of the cell diameters, the islands of the resin particles preferably have a diameter or a length of 200 μm or less, more preferably 150 μm or less, most preferably 100 μm or less. For reasons of minimizing the amount of the coloring agent which is present or exposed on surfaces of the islands, the diameter or length of the islands is preferably 0.05 μm or more, more preferably 0.08 μm or more, most preferably 0.1 μm or more.

It is not necessary that the coloring agent should be completely covered with the thermoplastic polymer. Rather, a part of the coloring agent may expose on outer surfaces of the resin particles as long as the succeeding surface treatment with an organic peroxide is not inhibited. For example, when the resin particles are obtained by cutting an extruded mass of the kneaded mixture, the coloring agent may present on the cut surfaces. Since the amount of such a surface-exposed coloring agent is small, the resin particles can be surface-treated with an organic peroxide.

The size of the islands may be measured by transmission electron microscopy. Thus, resin particles are immersed in liquid nitrogen and 100 resin particles are then sliced with a microtome along a plane normal to the extrusion direction. A photograph of the cut surface of each of the particles is taken by a transmission electron microscope. One of the islands present near the periphery of the particle is arbitrarily selected and measured for the maximum diameter. Similar measurement is carried out for each of the 100 resin particles and a mean diameter of the 100 islands represents the diameter (or length) of the islands of the resin particles. To facilitate the measurement, the base resin or the thermoplastic polymer may be dyed. The sea-islands structure of the foamed and expanded beads obtained from the resin particles may be similarly confirmed by a transmission electron microscope.

The resin particles thus obtained are then treated with an organic peroxide to modify surfaces thereof and thereafter foamed and expanded with a blowing agent to obtain expanded beads of the present invention suitable for the production of PP moldings in a mold. The surface modification treatment, expansion of the surface-modified particles and production of PP moldings may be suitably carried out in accordance with the methods disclosed in International Publication Number WO03/037971, published May 8, 2003, the disclosure of which, inclusive of the specification, claims and drawings, is hereby incorporated in its entirety by reference herein. These methods will be briefly described below.

The surface modification treatment is preferably carried out by dispersing the resin particles in a dispersing medium containing an organic peroxide to obtain a dispersion. The dispersion is heated at a temperature lower than the melting point of the base resin but sufficient to decompose the organic peroxide, thereby obtaining surface-modified resin particles. Because the coloring agent of the resin particles is contained in the islands dispersed in the sea of the base resin, the surface treatment may be effectively performed as in the case where the coloring agent is not used. Therefore, expanded beads obtained from the surface-treated particles have a surface region having better fuse-bonding properties as compared with an inside region surrounded by the surface region and can give a high rigidity PP molding in a mold using steam at a relatively low temperature.

Examples of the dispersing medium include water, ethylene glycol, glycerin, methanol, ethanol or a mixture of them. An aqueous dispersion medium, preferably water, more preferably ion-exchanged water, is suitably used.

Any organic peroxide may be used for the purpose of the present invention as long as it decomposes when heated at a temperature lower than the melting point of the base resin. Bis(4-t-butylcyclohexyl)peroxydicarbonate is one of the particularly suitable examples of the peroxides. The organic peroxide is generally used in an amount of 0.01–10 parts by weight per 100 parts by weight of the resin particles.

In the dispersion obtained by dispersing the resin particles in a dispersing medium containing an organic peroxide, it is preferred that the weight ratio of the resin particles to the dispersing medium be 1.3:1 or less, more preferably 1.2:1 or less, much more preferably 1.1:1 or less, most preferably 1:1 or less, for reasons of uniformly treating the particles with the organic peroxide. The weight ratio of the resin particles to the dispersing medium is desirably at least 0.6:1, more preferably at least 0.7:1 since the amount of the organic peroxide relative to the resin particles can be reduced.

In the present invention, it is preferred that the polypropylene resin, the base resin, the resin particles, the surface-modified resin particles, expanded beads produced from the surface-modified resin particles and PP molding obtained from the expanded beads be substantially non-crosslinked. The term "substantially non-crosslinked" as used herein is as defined below.

Sample is immersed in xylene (100 ml xylene per 1 g sample) and the mixture is refluxed for 8 hours. The mixture is then immediately filtered through a 74 μm wire net (specified in Japanese Industrial Standard JIS Z8801(1966). The dry weight of the xylene-insoluble matters left on the wire net is measured. A crosslinking degree P (%) is calculated from the formula:

$$P(\%) = (M/L) \times 100$$

wherein M represents the weight (g) of the xylene-insoluble matters and L represents the weight (g) of the sample. "Substantially non-crosslinked" means that the crosslinking degree P is 10% or less.

In the present invention, the crosslinking degrees P of the base resin, resin particles, surface-treated (or surface modified) resin particles, expanded beads and PP molding are each preferably 5% or less, more preferably 3% or less, most preferably 1% or less. In general, the surface treatment does not result in an increase of the crosslinking degree P.

The surface-modified resin particles are then foamed and expanded to obtain expanded beads using a blowing agent. The expansion may be carried out by impregnating the resin particles with a blowing agent at an elevated temperature under a pressurized condition. The impregnated resin particles are then cooled to room temperature and, subsequently, the pressure is released to obtain expandable resin particles. The expandable resin particles are then expanded with a heating medium such as steam or hot air. Alternatively, the expansion step may be carried out by a conventional dispersion method in which the resin particles are dispersed in a dispersing medium in a closed vessel in the presence of a blowing agent and heated to impregnate the resin particles with the blowing agent. While being maintained under a pressurized condition and at a temperature sufficient to expand the resin particles, the dispersion is discharged from the vessel to an atmosphere having a pressure lower than the pressure in the vessel, thereby obtaining expanded beads. The dispersion method is preferable for the purpose of the present invention, since expanded particles may be efficiently obtained within a short period of time.

The blowing agent may be an organic physical blowing agent or an inorganic physical blowing agent. Examples of the organic physical blowing agents include aliphatic hydrocarbons such as propane, butane, pentane, hexane and heptane, alicyclic hydrocarbons such as cyclobutane and cyclohexane, and halogenated hydrocarbons such as chlorofluoromethane, trifluoromethane, 1,2-difluoroethane, 1,2,2,2-tetrafluoroethane, methyl chloride, ethyl chloride and methylene chloride. Examples of inorganic physical blowing agents include air, nitrogen, carbon dioxide, oxygen, argon and water. These organic and inorganic blowing agents may be used singly or as a mixture of two or more. For reasons of stability (uniformity) of apparent density of expanded beads, low costs and freedom of environmental problem, the use of air or nitrogen is preferred. Water as the blowing agent may be that used in dispersing the surface-modified resin particles in the dispersing medium.

It is preferred that the expansion of the surface-modified resin particles be performed so that the expanded beads have an apparent density of 10 g/L to 500 g/L for reasons of satisfactory mechanical strengths and lightness in weight of PP moldings obtained from the expanded beads. The apparent density (g/L) is obtained by dividing the weight W (g) of the expanded beads by the volume V (L) of the apparent volume thereof (density =W/V). The apparent volume is measured as follows:

In a measuring cylinder, about 5 g of expanded beads are allowed to stand at 23° C. for 48 hours in the atmosphere and thereafter immersed in 100 ml water contained in a graduation cylinder at 23° C. From the increment of the volume, the apparent volume can be determined.

It is preferred that the expansion of the surface-modified resin particles be performed so that the expanded beads have a high temperature endothermic peak, in a DSC curve thereof, in addition to an intrinsic endothermic peak located at a lower temperature side of the high temperature peak, because the expanded beads have high content of closed cells and extremely suited to obtain a high strength PP molding.

The high temperature peak preferably has such an area corresponding to heat of fusion (calorific value; absolute value) of at least 15 J/g, more preferably at least 20 J/g, most preferably at least 25 J/g, for reasons of high compression strength of a PP molding obtained therefrom. From the standpoint of decreasing the molding temperature, the heat of fusion is preferably not greater than 60 J/g, more preferably not greater than 55 J/g, most preferably not greater than 50 J/g. It is also preferred that the heat of fusion of the high temperature peak is 15–60%, more preferably 20–50%, of a total of the heat of fusion of the high temperature peak and the heat of fusion of the intrinsic peak, for reasons of suitable compression strength and good energy absorbing property while ensuring good molding efficiency. The total heat of fusion is suitably in the range of 40–150 J/g. The measurement of a high temperature peak by DSC analysis is described in aforementioned International Publication Number WO03/037971.

In the present specification, the term "melting point of the base resin" is intended to refer to that measured by DSC analysis of base resin particles which have not yet been subjected to surface modification treatment with an organic peroxide. The melting point of the base resin is measured by DSC analysis described in aforementioned International Publication Number WO03/037971.

As described previously, the heat of fusion Hs of the high temperature endothermic peak of the surface region of the bead is smaller than the heat of fusion Hi of the high temperature endothermic peak of the inside region of the bead. Preferably, Hs and Hi have the following relationship:

Hs<0.86×Hi, more preferably Hs<0.83×Hi, still more preferably Hs<0.80×Hi, yet still more preferably Hs<0.78× Hi, yet still more preferably Hs≦0.75×Hi, most preferably Hs<0.73×Hi. Preferably, Hs is not smaller than 0.25×Hi (Hs≧0.25×Hi).

It is also preferred that Hs is in the range of 1.7 to 60 J/g, more preferably 2 to 50 J/g, still more preferably 3 to 45 J/g, most preferably 4 to 40 J/g, for reasons of availability of a low molding temperature. The heat of fusion Hs and Hi may be measured by a method described in aforementioned International Publication Number WO03/037971.

A PP molding may be suitably obtained by a batch-type molding method in which expanded beads (if necessary, after being treated to increase the pressure inside of the cells thereof) are filled in a mold adapted to be heated and cooled and to be opened and closed. After closing the mold, saturated steam is fed to the mold to heat and fuse-bond the beads together. The mold is then cooled and opened to take a PP molding out of the mold. A number of molding machines are commercially available. They are generally designed to have a pressure resistance of 0.41 MPa(G) or 0.45 MPa(G). Thus, the above method is generally carried out using steam having a pressure of 0.45 MPa(G) or less, more preferably 0.41 MPa(G) or less.

A PP molding may be also produced by a continuous method in which expanded beads (if necessary, after being treated to increase the pressure inside of the cells thereof) are fed to a path which is defined between a pair of belts continuously running in the same direction and which has a heating zone and a cooling zone. During the passage through the heating zone, the expanded beads are heated with saturated steam and fuse-bonded to each other. The resulting molding is cooled in the cooling zone, discharged from the path and cut to a desired length. The above continuous method is disclosed in, for example, JP-A-H09-104026, JP-A-H09-104027 and JP-A-H10-180888.

A surface layer, such as a reinforcing layer or a decorative layer) may be integrally provided on a surface of the above PP molding. A method of producing such a composite article is disclosed in, for example, U.S. Pat. Nos. 5,928,776, 6,096,417, 6,033,770, 5,474,841, EP-B-477476, WO98/ 34770, WO98/00287 and JP-B-3092227, the disclosure of which is hereby incorporated by reference herein.

An insert may be integrated with the above PP molding such that at least part of the insert is embedded therein. A method of producing such a composite article is disclosed in, for example, U.S. Pat. Nos. 6,033,770, 5,474,841, JP-A-S59-127714 and JP-B-3092227, the disclosure of which is hereby incorporated by reference herein.

The following examples will further illustrate the present invention. Parts are by weight.

EXAMPLES 1–8

Preparation of Master Batch:

60 Parts of a thermoplastic polymer (master batch polymer) selected from those shown in Table 1 and indicated in Tables 3.1 and 3.2 were mixed and kneaded with 40 parts of a coloring agent selected from those shown in Table 2 and indicated in Tables 3.1 and 3.2 using a two-axis kneader to obtain master batches having MFR shown in Tables 3.1 and 3.2.

TABLE 1

| Thermoplastic Polymer | MFR (g/10 min) |
|---|---|
| EPR: Ethylene-propylene copolymer rubber (ethylene content: 80 mole %) | 4 |
| b-PP: Propylene-ethylene block copolymer (ethylene content: 5 mole %) | 8 |
| LD: Low density polyethylene (density: 927 g/L) | 17 |

TABLE 2

| Coloring agent | Average diameter (nm) |
|---|---|
| CB1: Carbon black | 17 |
| CB2: Carbon black | 30 |
| CB3: Carbon black | 120 |

Preparation of Resin Particles:

A quantity of a propylene homopolymer (HPP) as a base resin having a glass transition point of −20° C., a Vicat softening point of 147° C., a melting point of 160.7° C., a tensile modulus of 1,440 MPa and MFR of 21 g/10 minutes was melted and kneaded together with a quantity of the master batch shown in Tables 3.1 and 3.2 and zinc borate powder (cell controlling agent) using a two-axis kneader to obtain a kneaded mixture such that the kneaded mixture had a coloring agent content shown in Tables 3.1 and 3.2. The zinc borate powder was used in an amount of 0.05 part by weight per 100 parts by weight of the kneaded mixture.

The kneaded mixture was extruded through a nozzle of an extruder into strands. The strands were immediately introduced in water at 25° C. for quenching. The cooled strands were then cut to obtain particles having a length/diameter ratio of about 1.0 and a mean weight of 2 mg. The transmission electron microscopy revealed that the resin particles had a sea-islands structure with a length (diameter) of the island in the range of 0.05 to 200 µm.

Preparation of Expanded Particles:

In a 5 liter autoclave, 100 parts of the above resin particles are charged together with 300 parts of ion-exchanged water, 0.01 part of sodium dodecylbenzenesulfonate (surfactant), 0.3 part of kaolin powder (dispersing agent), 0.01 part of aluminum sulfate powder (dispersion enhancing agent), 1.0 part of bis(4-t-butylcyclohexyl) peroxydicarbonate (organic peroxide) and dry ice (carbon dioxide blowing agent) in an amount shown in Tables 3.1 and 3.2. The mixture in the autoclave was dispersed with stirring and heated to a temperature lower by 5° C. than the expansion temperature shown in Tables 3.1 and 3.2 at a heating rate of 2° C./min and then maintained at that temperature for 15 min. Thereafter, the temperature was raised to the expansion temperature at a heating rate of 2° C./min and maintained at that temperature for 15 min so that the inside pressure was P MPa(G). Nitrogen was fed to the autoclave under pressure so that the inside pressure was increased to (P+0.49) MPa (G). One end of the autoclave was then opened to discharge the dispersion to the atmosphere to obtain expanded beads. The discharge was carried out while feeding carbon dioxide gas such that the pressure within the autoclave was maintained at a pressure of (P+0.49) MPa(G).

The expanded beads were washed and allowed to stand in the atmosphere for 24 hours for aging. The beads were then measured for heat of fusion of a high temperature peak thereof and of high temperature peaks of surface and inside regions thereof. The results are summarized in Tables 3.1 and 3.2.

COMPARATIVE EXAMPLES 1–3

60 Parts of the propylene homopolymer (above-described HPP) as a master batch polymer were mixed and kneaded with 40 parts of a coloring agent selected from those shown in Table 2 and indicated in Tables 3.1 and 3.2 to obtain master batches having MFR shown in Tables 3.1 and 3.2. Using the master batch, resin particles and expanded beads were prepared in the same manner as described above. The properties of the expanded beads are shown in Tables 3.1 and 3.2.

REFERENCE EXAMPLE 1

Example 1 was repeated in the same manner as described except that no coloring agent was used. Thus, the resin constituting the resin particles was propylene homopolymer (HPP) only. The properties of the expanded beads are shown in Tables 3.1 and 3.2.

Using the expanded beads obtained in Examples 1–8, Comparative Examples 1–3 and Reference Example 1, PP moldings were produced using a molding device which withstood a steam pressure of 0.45 MPa(G) and which had male and female molds adapted to be displaced relative to each other. When the molds are located in a fully closed position, a mold cavity having a length of 400 mm, a width of 200 mm and a depth of 50 mm is defined therebetween at a central part thereof. The expanded beads were placed in the mold cavity in such a state that the molds were not fully closed but a slight space of about 10 mm was formed in the depth direction between the marginal parts of the molds (about 1 mm gap was defined between the two molds in the peripheral portion of the mold cavity). After the air in the mold cavity was purged with steam, the molds were fully closed and steam at the predetermined molding pressure shown in Tables 3.1 and 3.2 was fed to the mold cavity for heating and molding the beads. After completion of the molding, the molds were cooled with water so that the surface pressure of the PP molding within the mold cavity was decreased to 0.059 MPa(G). The PP molding was taken out of the mold cavity, aged at 60° C. for 24 hours and then allowed to be cooled to room temperature.

The molding pressure of the saturated steam shown in Tables 3.1 and 3.2 was the minimum steam pressure $P_{min}$ (MPa(G)) required for obtaining a fuse-bonding efficiency of 0.6 or more and determined by repeatedly producing moldings at various saturated steam pressures increasing from 0.15 MPa(G) to 0.45 MPa(G) at an interval of 0.01 MPa(G). Thus, at a pressure ($P_{min}$–0.01) MPa, the beads were incapable of providing a fuse-bonding efficiency of 0.6. The fuse bonding efficiency is measured as follows:

A cut with a depth of 10 mm is formed on one of the two largest sides (400 mm×200 mm) of a sample of PP molding (size: 400 mm×200 mm×50 mm). The sample is then broken along the cut line with hands. The surface along which the sample is divided is observed to count a total number C1 of the beads present on the surface and the number C2 of the beads having destroyed cells. The ratio C2/C1 represents the fuse-bonding efficiency.

The base resin, resin particles, expanded beads and PP moldings used or produced in the above examples and comparative examples were found to have a boiling xylene insoluble matter content of 0 (zero) and to be non-crosslinked.

The thus obtained PP moldings were measured for the apparent density, 50% compression strength, secondary expansion efficiency, L value and color tone according to the following methods.

The apparent density of a PP molding is measured according to the method specified in JIS K7222-1999.

For the measurement of the 50% compression strength, a sample having a size of a length of 50 mm, a width of 50 mm and a thickness of 25 mm is cut from inside of a PP molding. The sample is compressed according to JIS Z0234-1976 at a temperature of 23° C. with a compression speed of 10 mm/minute until a strain of 55% is reached. From the stress-strain curve thus obtained, a stress at a 50% strain (50% compression strength) is determined.

The secondary expansion efficiency is evaluated according to the following ratings:

A: No gaps are observed between cells on surfaces of PP molding and the corners of the PP molding have the same shape as those of the mold cavity.

B: Slight gaps are observed between cells on surfaces of PP molding and the corners of the PP molding are slightly rounded.

C: Significant gaps are observed between cells on surfaces of PP molding and the corners of the PP molding are rounded.

The L value is measured using a reflection-type calorimeter (X-Rite 948 SPECTROCOLORIMETER manufactured by X-Rite Inc.) in the Lab mode.

The color tone is evaluated according to the following ratings:
A: $0 \leq$ L value $\leq 20$
B: $20 <$ L value $\leq 60$
C: $60 <$ L value $\leq 80$
D: $80 <$ L value $\leq 100$ The results are also shown in Tables 3.1 and 3.2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

TABLE 3.1

| Example | 1 | 2 | 3 | 4 | | |
|---|---|---|---|---|---|---|
| Comparative Example | | | | | 1 | |
| Reference Example | | | | | | 1 |
| Base resin | HPP | HPP | HPP | HPP | HPP | HPP |
| Master batch polymer | b-PP | LD | EPR | EPR | HPP | — |
| Coloring agent | CB2 | CB2 | CB2 | CB3 | CB2 | — |
| MFR of Master batch (g/10 min) | 0.6 | 6.6 | 0.4 | 3.3 | 5.3 | — |
| Content of coloring agent (wt %) | 0.5 | 0.5 | 0.5 | 0.5 | 0.5 | — |
| Expansion temperature (° C.) | 165.3 | 165.0 | 165.0 | 165.0 | 165.8 | 165.3 |
| Amount of carbon dioxide (part) | 3.5 | 3.5 | 3.5 | 3.5 | 2.5 | 3.5 |
| Apparent density of expanded beads (g/L) | 80 | 84 | 81 | 81 | 80 | 80 |
| Heat of fusion of high temperature peak (J/g) whole | 38 | 40 | 41 | 41 | 38 | 38 |
| Heat of fusion of high temperature peak (J/g) surface region | 29 | 30 | 30 | 26 | 33 | 26 |
| Heat of fusion of high temperature peak (J/g) inside region | 42 | 43 | 44 | 44 | 41 | 39 |
| Molding pressure (MPa (G)) | 0.41 | 0.41 | 0.41 | 0.43 | 0.44 | 0.41 |
| Apparent density of PP molding (g/L) | 59 | 59 | 60 | 60 | 60 | 60 |
| 50% Compression strength (KPa) | 684 | 683 | 687 | 693 | 712 | 684 |
| Secondary expansion efficiency | B | B | A | B | B | B |
| L Value | 38 | 45 | 44 | 55 | 30 | 86 |
| Evaluation of color tone | B | B | B | B | B | D |

TABLE 3.2

| Example | 5 | | 6 | 7 | 8 | |
|---|---|---|---|---|---|---|
| Comparative Example | | 2 | | | | 3 |
| Reference Example | | | | | | |
| Base resin | HPP | HPP | HPP | HPP | HPP | HPP |
| Master batch polymer | EPR | HPP | LD | b-PP | EPR | HPP |
| Coloring agent | CB2 | CB2 | CB1 | CB1 | CB1 | CB1 |
| MFR of Master batch (g/10 min) | 0.4 | 5.3 | 6.6 | 0.6 | 0.4 | 0.6 |
| Content of coloring agent (wt %) | 3 | 3 | 0.5 | 0.5 | 0.5 | 0.5 |
| Expansion temperature (° C.) | 165.0 | 165.6 | 165.0 | 165.0 | 165.0 | 166.0 |
| Amount of carbon dioxide (part) | 3.5 | 2.5 | 3.5 | 3.5 | 3.5 | 2.5 |
| Apparent density of expanded beads (g/L) | 84 | 80 | 80 | 83 | 79 | 85 |
| Heat of fusion of high temperature peak (J/g) whole | 41 | 38 | 39 | 38 | 39 | 39 |
| Heat of fusion of high temperature peak (J/g) surface region | 33 | 35 | 31 | 29 | 31 | 33 |
| Heat of fusion of high temperature peak (J/g) inside region | 43 | 40 | 44 | 42 | 45 | 41 |
| Molding pressure (MPa (G)) | 0.43 | 0.45 | 0.41 | 0.41 | 0.41 | 0.43 |
| Apparent density of PP molding (g/L) | 61 | 60 | 59 | 59 | 59 | 63 |
| 50% Compression strength (KPa) | 709 | 703 | 690 | 700 | 682 | 731 |
| Secondary expansion efficiency | B | B | B | B | A | B |
| L Value | 17 | 5 | 36 | 37 | 37 | 28 |
| Evaluation of color tone | A | A | B | B | B | B |

What is claimed is:

1. An expanded bead comprising cell walls defining a plurality of closed cells, each of said cell walls comprising a matrix of a base resin including a polypropylene resin and having a tensile modulus of at least 1,200 MPa and a multiplicity of domains dispersed in said matrix and each containing a coloring agent and a thermoplastic polymer having a tensile modulus lower than that of said base resin, said expanded bead comprising an inside region surrounded by a surface region, each of said inside and surface regions showing a high temperature peak in a DSC curve thereof, the heat of fusion of the high temperature peak of the surface region being lower than that of the inside region, said expanded bead having a sea-islands structure wherein said matrix is the sea and said domains are the islands.

2. The expanded bead as claimed in claim 1, wherein said thermoplastic polymer is at least one polymer selected from the group consisting of an ethylene-based polymer, a thermoplastic elastomer and a propylene-based polymer.

3. The expanded bead as claimed in claim 2, wherein said ethylene-based polymer is an ethylene-propylene rubber.

4. The expanded bead as claimed in claim 2, wherein said propylene-based polymer is a copolymer of propylene with α-olefin other than propylene and wherein said base resin includes a propylene homopolymer.

5. The expanded bead as claimed in claim 1, wherein said polypropylene resin has a tensile modulus of at least 1,200 MPa.

6. the expanded bead as claimed in claim 5, wherein said polypropylene resin is a propylene homopolymer.

7. The expanded bead as claimed in claim 1, wherein said coloring agent is carbon black.

8. The expanded bead as claimed in claim 7, wherein said carbon black has an average particle diameter of 5 nm to 100 nm.

9. The expanded bead as claimed in claim 7, wherein said carbon black is used in an amount of 0.1% by weight or more but less than 5% by weight based on a total weight of said base resin and said thermoplastic polymer.

10. The expanded bead as claimed in claim 1, wherein the mixture of the coloring agent and the thermoplastic polymer has a viscosity greater than that of the base resin.

11. The expanded bead as claimed in claim 10, wherein the mixture of the coloring agent and the thermoplastic polymer has a melt flow rate of 0.1–50 g/10 min.

12. The expanded bead as claimed in claim 10, wherein the mixture of the coloring agent and the thermoplastic polymer has a melt flow rate of 0.2–30 g/10 min.

13. The expanded bead as claimed in claim 10, wherein the mixture of the coloring agent and the thermoplastic polymer has a melt flow rate of 0.3–10 g/10 min.

14. The expanded bead as claimed in claim 13, wherein said polypropylene resin has a melt flow rate of 10–70 g/10 min.

15. The expanded bead as claimed in claim 1, wherein said polypropylene resin has a tensile yield strength of at least 31 Mpa and a tensile breaking elongation of 200–1000%.

16. The expanded bead as claimed in claim 1, wherein said base resin has a tensile modulus of at least 1250 MPa.

17. The expanded bead as claimed in claim 1, wherein said base resin has a tensile modulus of at least 1300 MPa.

18. The expanded bead as claimed in claim 1, wherein said base resin has a tensile modulus of 1360–2500 MPa.

19. Expanded beads as claimed in claim 1, produced by a process comprising:
(a) kneading the coloring agent and the thermoplastic polymer having a tensile modulus lower than that of the base resin to form a master batch;
(b) then kneading the master batch with the base resin to form a kneaded mixture comprising a matrix of the base resin and a multiplicity of domains dispersed in said matrix, each domain being composed of the thermoplastic polymer and; the coloring agent;
(c) forming the kneaded mixture into resin particles;
(d) treating the resin particles with an organic peroxide to modify surfaces of the resin particles: and
(e) foaming and expanding the surface-modified resin particles to obtain the expanded beads.

20. Expanded beads as claimed in claim 19, wherein the master batch has a viscosity greater than that of the base resin.

* * * * *